(12) United States Patent
Volkova et al.

(10) Patent No.: US 11,847,401 B2
(45) Date of Patent: Dec. 19, 2023

(54) METHOD AND APPARATUS FOR RECOGNIZING HANDWRITING INPUTS IN MULTIPLE-USER ENVIRONMENT

(71) Applicant: Samsung Electronics Co., Ltd., Suwon-si (KR)

(72) Inventors: Valentyna Volkova, Kyiv (UA); Kostiantyn Seliuk, Kyiv (UA); Nataliya Sakhnenko, Kyiv (UA); Oleksandr Marchenko, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/551,740

(22) Filed: Dec. 15, 2021

(65) Prior Publication Data

US 2022/0198124 A1  Jun. 23, 2022

(30) Foreign Application Priority Data

Dec. 18, 2020 (KR) .......................... 10-2020-0178928

(51) Int. Cl.
*G06F 40/103* (2020.01)
*G06F 40/166* (2020.01)
*G06V 30/19* (2022.01)
*G06V 30/18* (2022.01)

(52) U.S. Cl.
CPC .......... *G06F 40/103* (2020.01); *G06F 40/166* (2020.01); *G06V 30/18019* (2022.01); *G06V 30/19013* (2022.01); *G06V 30/19107* (2022.01)

(58) Field of Classification Search
CPC ..................................................... G06F 40/103
See application file for complete search history.

(56) References Cited

U.S. PATENT DOCUMENTS

| | | | |
|---|---|---|---|
| 5,666,438 A | 9/1997 | Beernink et al. | |
| 7,362,901 B2 | 4/2008 | Walch | |
| 9,747,491 B2 | 8/2017 | Mettyear et al. | |
| 2006/0282575 A1* | 12/2006 | Schultz et al. | .......... G06F 13/38 |
| 2007/0005537 A1 | 1/2007 | Abdulkader et al. | |
| 2007/0127818 A1 | 6/2007 | Thiesson et al. | |

(Continued)

FOREIGN PATENT DOCUMENTS

| | | |
|---|---|---|
| KR | 10-2014-0008773 A | 1/2014 |
| WO | 2014/200736 A1 | 12/2014 |

OTHER PUBLICATIONS

Kutzner et al., "Writer Identification Using Handwritten Cursive Texts and Single Character Words", 2019.

(Continued)

*Primary Examiner* — James J Debrow
(74) *Attorney, Agent, or Firm* — Jefferson IP Law, LLP

(57) ABSTRACT

A method and apparatus for adaptively displaying a handwriting input on an electronic device are provided. The method includes receiving a handwriting input from an electronic device, detecting handwriting features in the handwriting input and comparing the handwriting features with stored handwriting feature data, determining, according to a result of the comparing, whether a subject of the handwriting input is an existing user or a new user, and displaying, according to the determination, a subsequent handwriting input by the subject of the handwriting input to match a target handwriting input style.

18 Claims, 19 Drawing Sheets

(56) References Cited

U.S. PATENT DOCUMENTS

| | | | |
|---|---|---|---|
| 2007/0140561 A1* | 6/2007 | Abdulkader et al. | G06K 9/00 |
| 2014/0003675 A1 | 1/2014 | Li et al. | |
| 2014/0361983 A1* | 12/2014 | Dolfing et al. | G06F 3/04883 |
| 2016/0154997 A1* | 6/2016 | Kim et al. | G06K 9/00416 |
| 2018/0150839 A1* | 5/2018 | Gauld | G06Q 20/4014 |
| 2019/0339861 A1 | 11/2019 | Lee et al. | |
| 2020/0251217 A1* | 8/2020 | Cassuto et al. | G16H 50/20 |
| 2021/0350122 A1* | 11/2021 | Dixon et al. | G06K 9/00 |
| 2023/0214028 A1* | 7/2023 | Chen et al. | G06F 3/03542 |

OTHER PUBLICATIONS

Schlapbach et al., "A writer identification system for online whiteboard data", 2008.
Zhang et al., "End-to-End Online Writer Identification With Recurrent Neural Network", 2016.
International Search Report and Written Opinion dated Mar. 25, 2022, issued in International Patent Application No. PCT/KR2021/019093.

\* cited by examiner

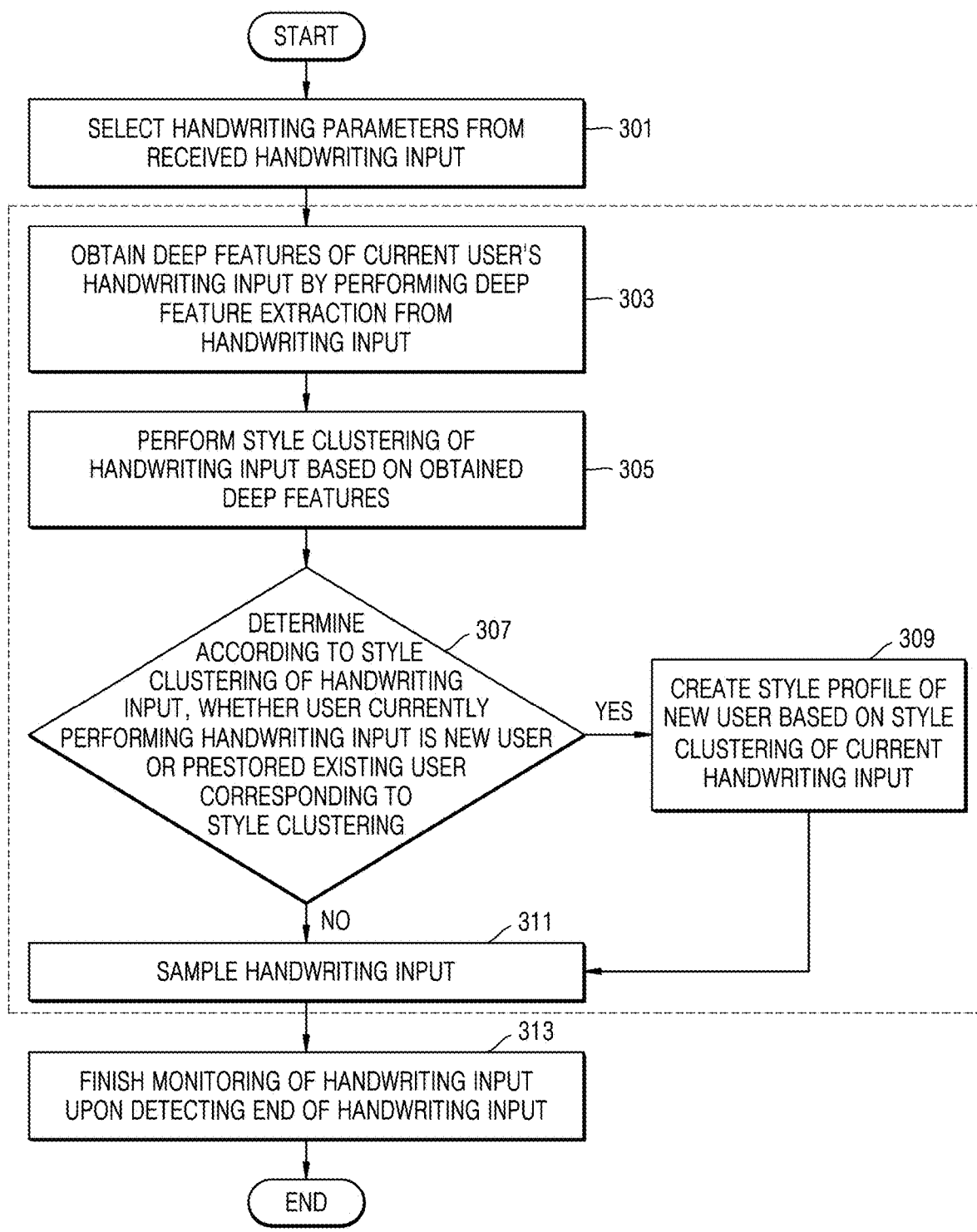

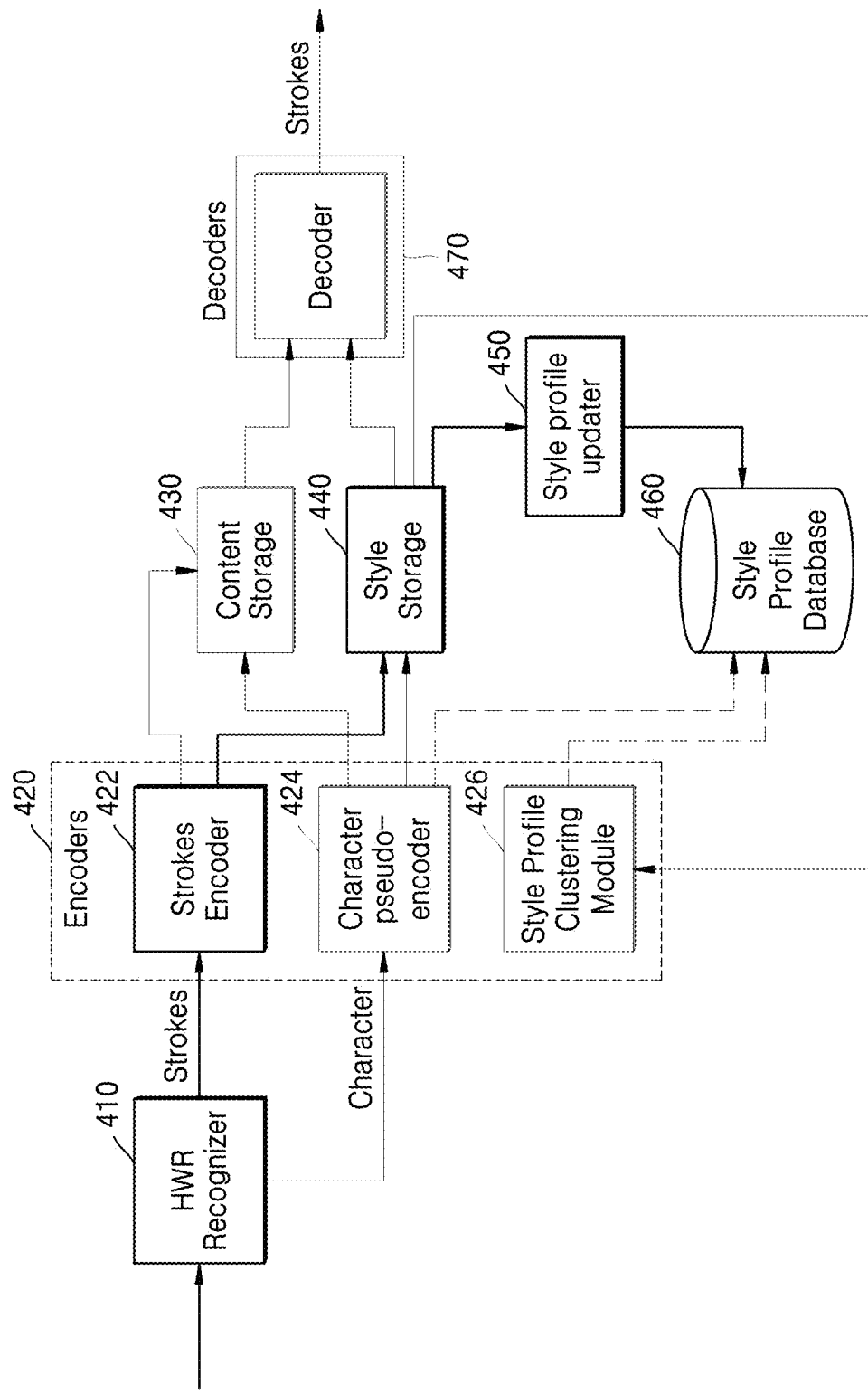

METHOD AND APPARATUS FOR RECOGNIZING HANDWRITING INPUTS IN MULTIPLE-USER ENVIRONMENT

CROSS-REFERENCE TO RELATED APPLICATION(S)

This application is based on and claims priority under 35 U.S.C. § 119(a) of a Korean patent application number 10-2020-0178928, filed on Dec. 18, 2020, in the Korean Intellectual Property Office, the disclosure of which is incorporated by reference herein in its entirety.

BACKGROUND

1. Field

The disclosure relates to a method and apparatus for adjusting a user's handwriting input. More particularly, the disclosure relates to a technique for adaptively displaying a handwriting input based on features extracted from a new handwriting input when receiving a user's handwriting input.

2. Description of Related Art

With the development of touch sensing technology and handwriting recognition technology of electronic devices, electronic devices for recognizing human handwriting have been widely used.

Although a handwriting input is usually performed by a single person on a personal cell phone such as a smartphone, electronic devices such as tablets shared by groups such as homes or businesses receive different types of handwriting inputs because they are shared by many people. Furthermore, as video teleconferencing has been actively used, multiple users may participate in one electronic template to perform handwriting inputs.

According to current technology, when a handwriting input is performed, an electronic device does not individually identify who performs the handwriting input. Thus, an electronic device used by several users does not individually identify, from among the several users, a user whose handwriting input is a currently received handwriting input. Even when the electronic device is able to individually identify, from among the several users, a user whose handwriting input is the currently received handwriting input, the electronic device requires separate user authentication.

Furthermore, when a user changes to another user while handwriting is being input, it is more difficult for the electronic device to complete a handwriting input.

The above information is presented as background information only to assist with an understanding of the disclosure. No determination has been made, and no assertion is made, as to whether any of the above might be applicable as prior art with regard to the disclosure.

SUMMARY

Even for a new user who is not in a database when handwriting is input, an electronic device needs to display a handwriting input according to a new user's handwriting style via adaptive learning.

Aspects of the disclosure are to address at least the above-mentioned problems and/or disadvantages and to provide at least the advantages described below. Accordingly, an aspect of the disclosure is to provide a method and apparatus for adjusting a user's handwriting input.

Additional aspects will be set forth in part in the description which follows and, in part, will be apparent from the description, or may be learned by practice of the presented embodiments.

In accordance with an aspect of the disclosure, an adaptive handwriting generation method is provided. The method includes receiving a handwriting input from an electronic device, detecting handwriting features in the handwriting input and comparing the handwriting features with stored handwriting feature data, determining, according to a result of the comparing, whether a subject of the handwriting input is an existing user or a new user, and displaying, according to the determination, a subsequent handwriting input by the subject of the handwriting input to match a target handwriting input style.

In accordance with another aspect of the disclosure, an adaptive handwriting generation apparatus is provided. The apparatus includes a display receiving a handwriting input, and a processor configured to detect handwriting features in the handwriting input and compare the handwriting features with stored handwriting feature data, determine, according to a result of the comparing, whether a subject of the handwriting input is an existing user or a new user, and control, according to the determination, a subsequent handwriting input by the subject of the handwriting input to match a target handwriting input style, wherein the processor is further configured to control the display to display the subsequent handwriting input based on the target handwriting input style.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a flowchart of a method of profiling a user's handwriting style, according to an embodiment of the disclosure;

FIG. 4C is a block diagram illustrating a method of generating a user's style profile, according to an embodiment of the disclosure;

Throughout the drawings, it should be noted that like reference numbers are used to depict the same or similar elements, features, and structures.

DETAILED DESCRIPTION

Figure 1A:
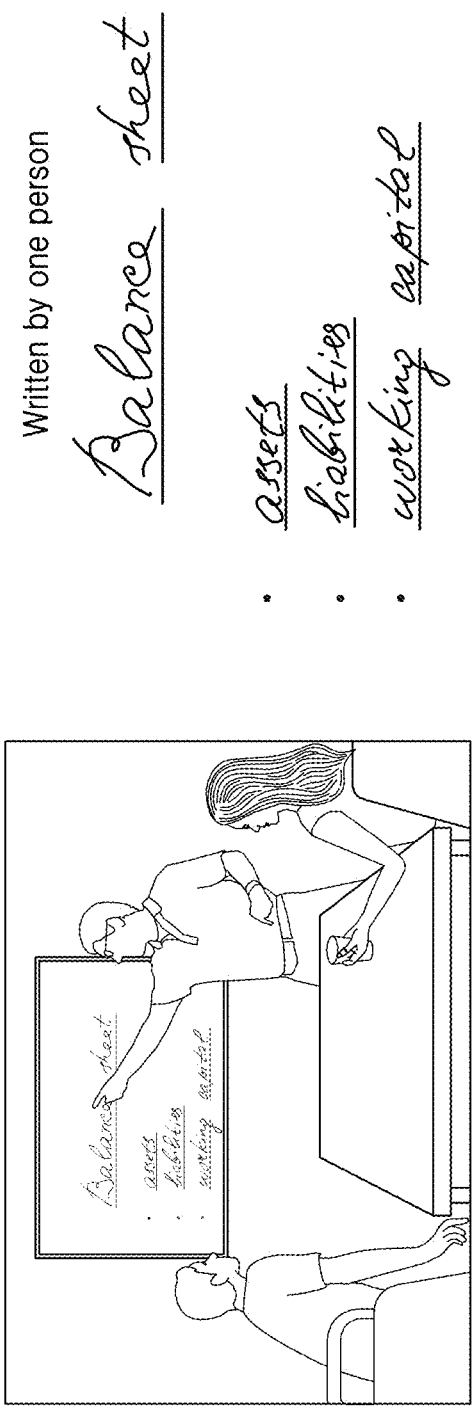
FIG. 1A is a diagram illustrating a single user's handwriting input according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Terms used in the present specification will now be briefly described and then the disclosure will be described in detail.

As the terms used herein, general terms that are currently widely used are selected by taking functions in the disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment of the disclosure. Thus, the terms used herein should be defined not by simple appellations thereof but based on the meaning of the terms together with the overall description of the disclosure.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Embodiments of the disclosure will now be described more fully hereinafter with reference to the accompanying drawings so that they may be easily implemented by those of ordinary skill in the art. However, the disclosure may have different forms and should not be construed as being limited to embodiments of the disclosure set forth herein. In addition, parts not related to descriptions of the disclosure are omitted to clearly explain embodiments of the disclosure in the drawings, and like reference numerals denote like elements throughout.

Each person has their own unique handwriting style. Each person's handwriting has unique characteristics that can be extracted from strokes, etc. An electronic device such as a smart device may monitor a style change while handwriting is being input to the electronic device.

According to the disclosure, functions may operate via a processor and a memory. The processor may be configured as one or a plurality of processors. In this case, the one or plurality of processors may be a general-purpose processor such as a central processing unit (CPU), an application processor (AP), or a digital signal processor (DSP), a dedicated graphics processor such as a graphics processing unit (GPU) or a vision processing unit (VPU), or a dedicated artificial intelligence (AI) processor such as a neural processing unit (NPU). The one or plurality of processors may control input data to be processed according to predefined operation rules or an AI model stored in the memory. Alternatively, when the one or more processors are a dedicated AI processor, the dedicated AI processor may be designed with a hardware structure specialized for processing a particular AI model.

FIG. 1A is a diagram illustrating a single user's handwriting input according to an embodiment of the disclosure.

Referring to FIG. 1A, a handwriting input received by an electronic device is performed by a single user. It can be seen based on a handwriting pattern and a shape of characters that the handwritten characters shown in FIG. 1A are input by a single user. Even when it is difficult to clearly identify an input character, the electronic device may relatively accurately identify the input character based on the learned handwriting pattern.

Figure 1B:
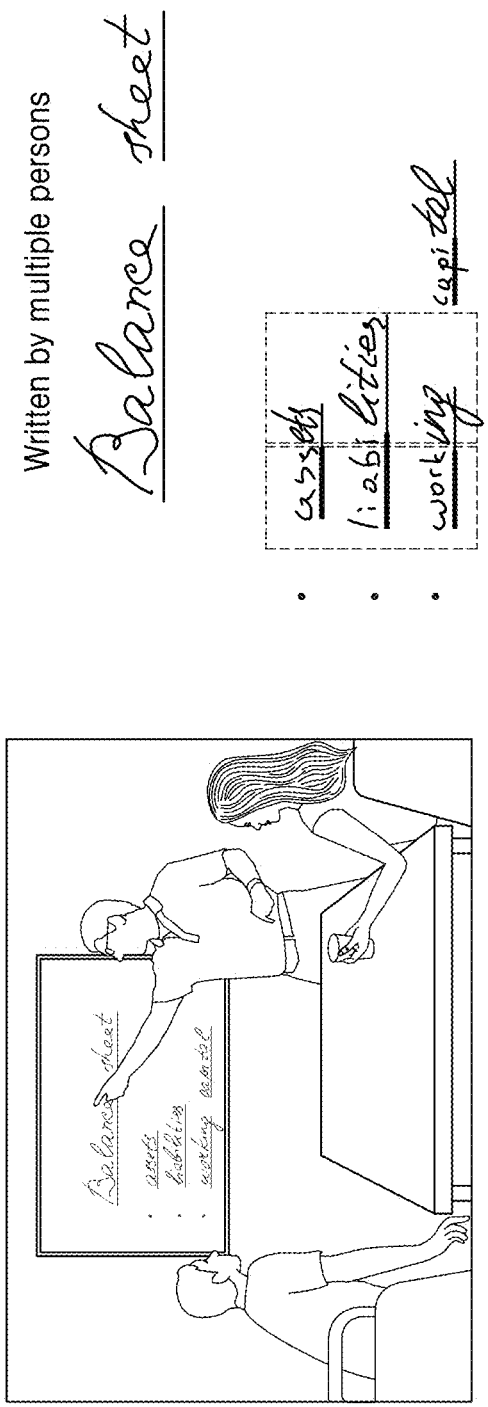
FIG. 1B is a diagram illustrating handwriting inputs from a plurality of users according to an embodiment of the disclosure.

FIG. 1B is a diagram illustrating handwriting inputs from a plurality of users according to an embodiment of the disclosure.

Referring to FIG. 1B, a handwriting input received by an electronic device is performed not by a single user but by two users. The handwriting input in FIG. 1B shows that handwriting inputs from the two users are mixed. In this case, it is difficult for the electronic device to clearly identify input characters, as compared to the handwriting input of FIG. 1A.

In general, the electronic device applies a user who performs a current handwriting input and a user's handwriting style to handwriting completion, handwriting synthesis, auto-completion, etc. However, in an environment in which a large number of users collaboratively participate in a handwriting input, it is difficult for the electronic device to apply handwriting styles of multiple users to handwriting completion, handwriting synthesis, handwriting style transmission, imitation of the handwriting input, and auto-completion of the handwriting input. Recent examples of an environment where a large number of users collaboratively participate in a handwriting input may include home sharing tablets, flipboards, family hubs, TVs, car touch panels, augmented reality (AR)/virtual reality (VR)/mixed reality (MR) devices, collaboration systems using online meetings, etc. The disclosure provides a method and apparatus whereby, in an environment in which a large number of users have recently participated in a handwriting input through collaboration, an electronic device applies handwriting styles of multiple users to handwriting completion, handwriting synthesis, handwriting style transmission, handwriting input imitation, and handwriting input auto-completion for a handwriting input from the multiple users. Here, it is assumed that the handwriting input occurs within a single session when a time difference is not large, but is not limited thereto.

Figure 2:
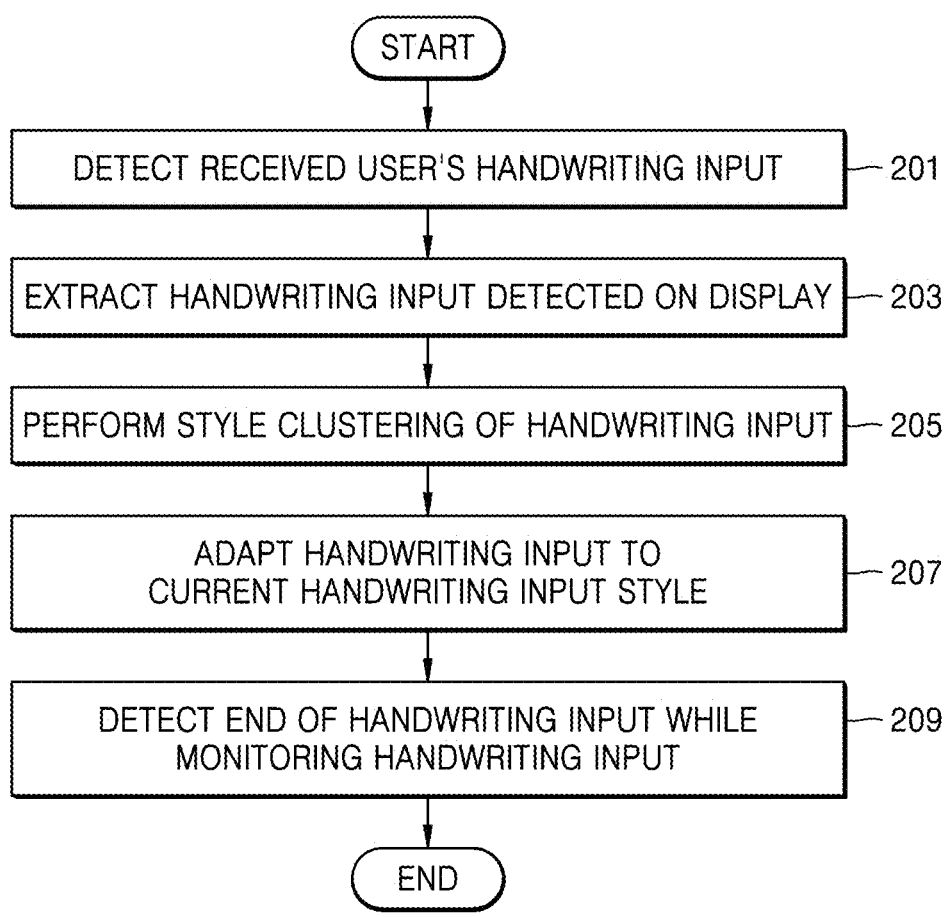
FIG. 2 is a flowchart of a method of performing style clustering of a handwriting input, according to an embodiment of the disclosure.

FIG. 2 is a flowchart of a method of performing style clustering of a handwriting input, according to an embodiment of the disclosure.

Referring to FIG. 2, in operation 201, an electronic device detects a received user's handwriting input. A handwriting input will usually be performed on a touch-sensitive touch display. The electronic device may analyze strokes from the handwriting input and measure a direction and a time (duration) in which the strokes are made to form a character.

In operation 203, the electronic device extracts a handwriting input detected on the display. In more detail, the electronic device extracts handwriting features from the handwriting input. As described with respect to operation 201, strokes, a direction of the strokes, a time when the strokes are made to construct a particular character, a handwriting style, etc. may be extracted as features of the handwriting input.

In operation 205, the electronic device performs style clustering of the handwriting input. The style clustering will be described in more detail below.

In operation 207, the electronic device adapts the handwriting input to a current handwriting input style. When it is determined that a new user performs a handwriting input according to features of the handwriting input, the electronic device may display handwriting that reflects a handwriting style of the new user.

In operation 209, the electronic device detects an end of the handwriting input while monitoring the handwriting input.

FIG. 3 is a flowchart of a method of profiling a user's handwriting style, according to an embodiment of the disclosure.

Referring to FIG. 3, in operation 301, an electronic device selects handwriting parameters from a received handwriting input. The handwriting parameters may include x- and y-axis coordinates of consecutive handwriting input points, their relative distances and directions, etc.

In operation 303, the electronic device obtains deep features of a current user's handwriting input by extracting the deep features from the handwriting input. The electronic device may construct a feature vector by using the obtained deep features.

In operation 305, the electronic device performs style clustering of the handwriting input based on the obtained deep features. The style clustering will be described in more detail below.

In operation 307, the electronic device determines, based on a result of the style clustering of the handwriting input, whether a user currently performing the handwriting input is a new user or an existing user corresponding to prestored style clustering. When it is determined, as a result of comparing style clustering data generated as a result of style clustering of the handwriting input with style clustering data stored in a memory of the electronic device or a database of a remote server, that the user currently performing the handwriting input is a new user, in operation 309, the electronic device generates a style profile of the new user based on the style clustering of the handwriting input currently being performed. In an embodiment of the disclosure, a user style profile refers to a set of deep features that characterize a user's handwriting style.

When it is determined, as a result of the electronic device comparing the style clustering data with the style clustering data stored in the memory of the electronic device or database of the remote server, that the user currently performing the handwriting input is an existing user, the electronic device samples the handwriting input in operation 311. In an embodiment of the disclosure, sampling a handwriting input means reconstructing a character or a sequence of characters from a user's style profile.

In operation 313, when an end of the handwriting input is detected, the electronic device finishes monitoring of the handwriting input.

Figure 4A:
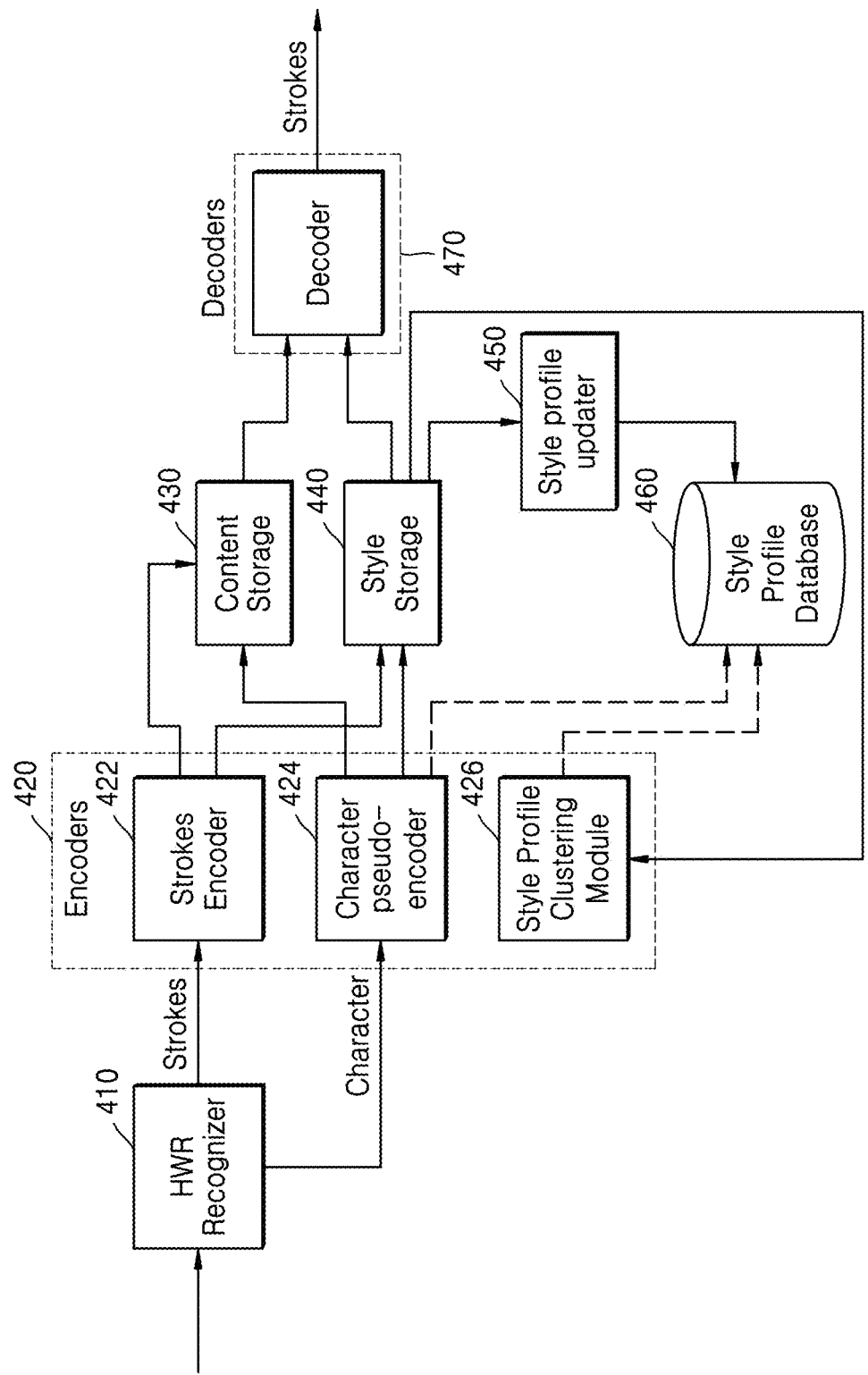
FIG. 4A is a block diagram illustrating a flow of generating a style profile for a handwriting input, according to an embodiment of the disclosure.

FIG. 4A is a block diagram illustrating a flow of generating a style profile for a handwriting input, according to an embodiment of the disclosure.

Referring to FIG. 4A, an apparatus for generating a style profile for a handwriting input includes a handwriting input recognizer ("HWR recognizer") 410, an encoder 420, a content storage 430, a style storage 440, a style profile updater 450, a style profile database 460, and a decoder 470. The encoder 420 may include a strokes encoder 422, a character pseudo-encoder 424, and a style profile clustering module 426. In an embodiment of the disclosure, the strokes encoder 422 is a deep recurrent neural network (RNN) that is trained to extract handwriting input features.

The character pseudo-encoder 424 is an encoder that handles a user's handwriting input style profile. In an embodiment of the disclosure, the character pseudo-encoder 424 selects a style of a character to be sampled. In an embodiment of the disclosure, the style profile clustering module 426 is a kind of hardware or software module that determines whether a user's handwriting input style matches a previously stored handwriting input style of the user. When the user's handwriting input style does not match the previously stored handwriting input style of the user, the style profile clustering module 426 determines the user as being a new user.

The style storage 440 is a kind of storage space that stores a user's style encoded by the encoder 420. The content storage 430 is also a kind of storage space that stores encoded actual characters ('a', 'b', etc.).

The decoder 470 is a part of a deep RNN that is trained to reconstruct characters according to features and content for a handwriting input received by the user. The reason for using an RNN is that an immediate previous state value of the RNN affects its current state value. In addition, the RNN is a neural network suitable when data is natural language data that is input sequentially.

The style profile updater 450 is a hardware or software module that stores a new handwriting style in the style profile database 460. The style profile database 460 is a database that stores a user's style and style features and a user's style profile generated based on the stored user's style and style features.

In an embodiment of the disclosure, the HWR recognizer 410, the encoder 420, the style profile updater 450, and the decoder 470 may be configured as one or more hardware processors. The content storage 430, the style storage 440, and the style profile database 460 may be configured as one or more integrated memories or respective separate memories.

Figure 4B:
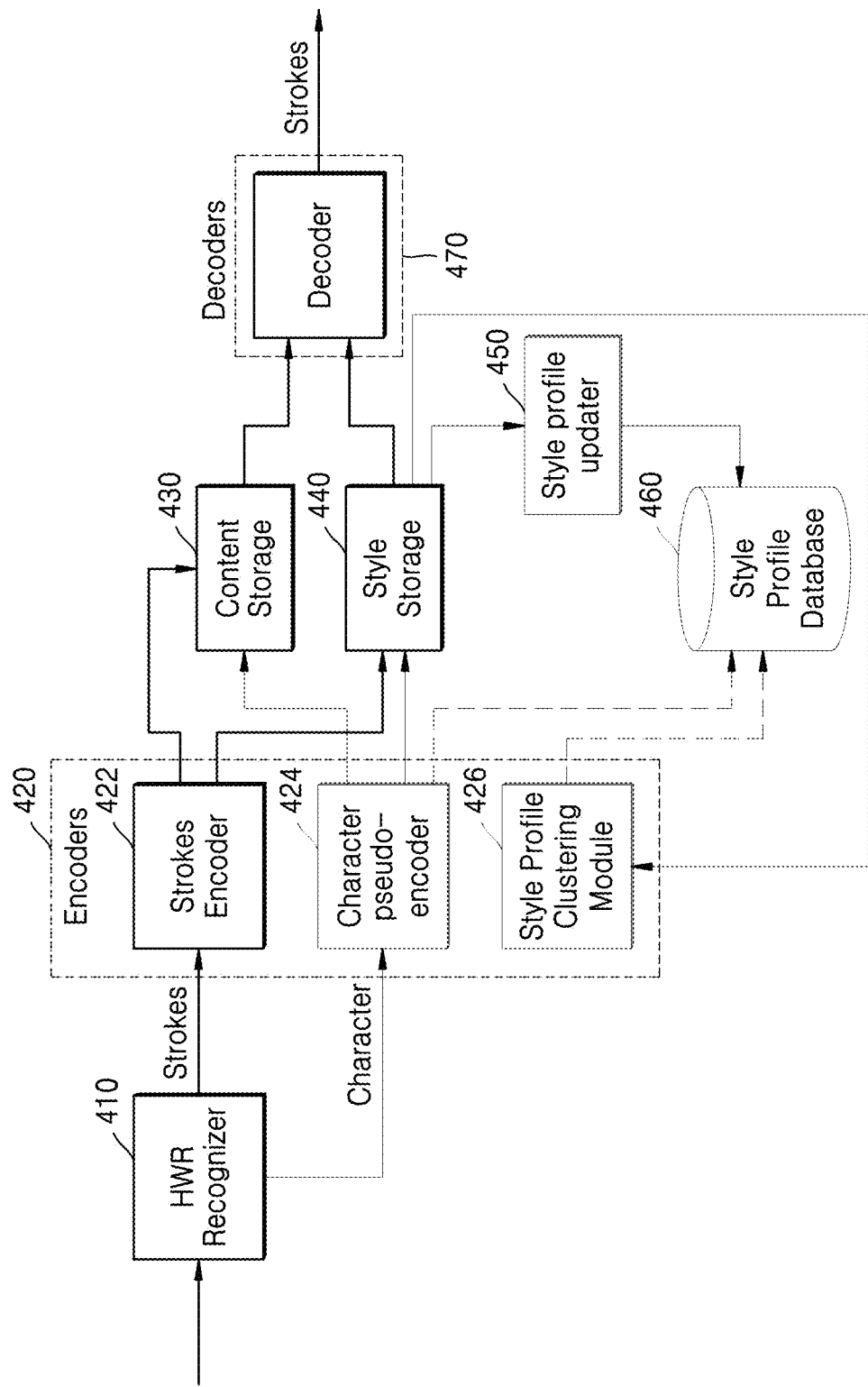
FIG. 4B is a block diagram illustrating a method of learning handwriting features extracted from a handwriting input, according to an embodiment of the disclosure.

FIG. 4B is a block diagram illustrating a method of learning handwriting features of a handwriting input, according to an embodiment of the disclosure.

Referring to FIG. 4B, a HWR recognizer 410 receives a user's handwriting to extract strokes from the handwriting, and a strokes encoder 422 that receives the extracted strokes learns handwriting input features. The decoder 470 learns how to recover a handwritten character from these learned features. In general, a recurrence formula at each time step in an RNN is expressed by Equation 1 below:

$$h_t = f_w(h_{t-1}, x_t) \quad \text{Equation 1}$$

where $h_t$ and $f_w$ respectively denote a new state and an activation function with parameters w, and $h_{t-1}$ and $x_t$ respectively denote a previous state and an input vector at each time step. In an embodiment of the disclosure, the activation function $f_w$ may be a tan h( ) non-linear function or a sigmoid or another activation function.

An RNN model is now described with reference to FIG. 5.

Figure 5:
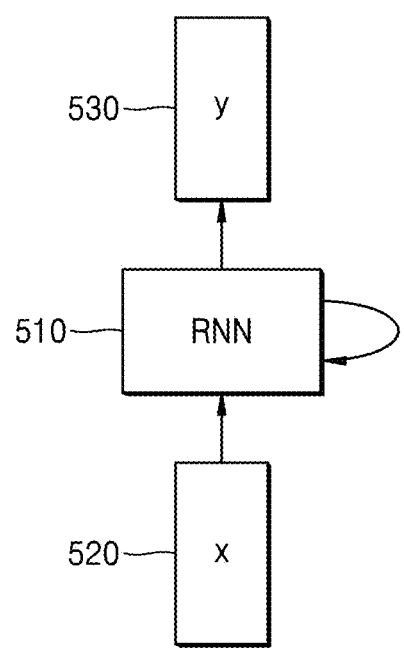
FIG. 5 is a block diagram illustrating a recurrent neural network (RNN) model according to an embodiment of the disclosure.

FIG. 5 is a block diagram illustrating an RNN model according to an embodiment of the disclosure.

Referring to FIG. 5, x 520 is an input vector. An output vector y 530 is generated via an RNN 510 that receives the input vector x 520. Such an RNN architecture usually shares the same weights. Neural networks, such as RNNs, that handle space and time varying data are also trained using the same weights.

Once the training is done, an adjusted weight is the same across all modes. In an embodiment of the disclosure, the training may be performed outside the electronic device. Until the electronic device learns a user's handwriting input, the user's handwriting input is continuously provided, and style learning is also performed in the same way.

FIG. 4C is a block diagram illustrating a method of generating a user's style profile, according to an embodiment of the disclosure.

The strokes encoder 422 stores, in the style storage 440, a user's handwriting input strokes and/or style features extracted from a user's handwriting input. The style profile updater 450 determines whether to generate a new style profile that is different from a style profile of an existing user based on the stored user's handwriting input strokes, and generates a new style profile when input handwritten strokes have stroke features that cannot be found in the style profile of the existing user as a result of analyzing the input handwritten strokes. The style profile database 460 stores a new user's style profile. Handwriting input sampling is required to generate a style profile. Handwriting input sampling is described with reference to FIG. 4D below.

Figure 4D:
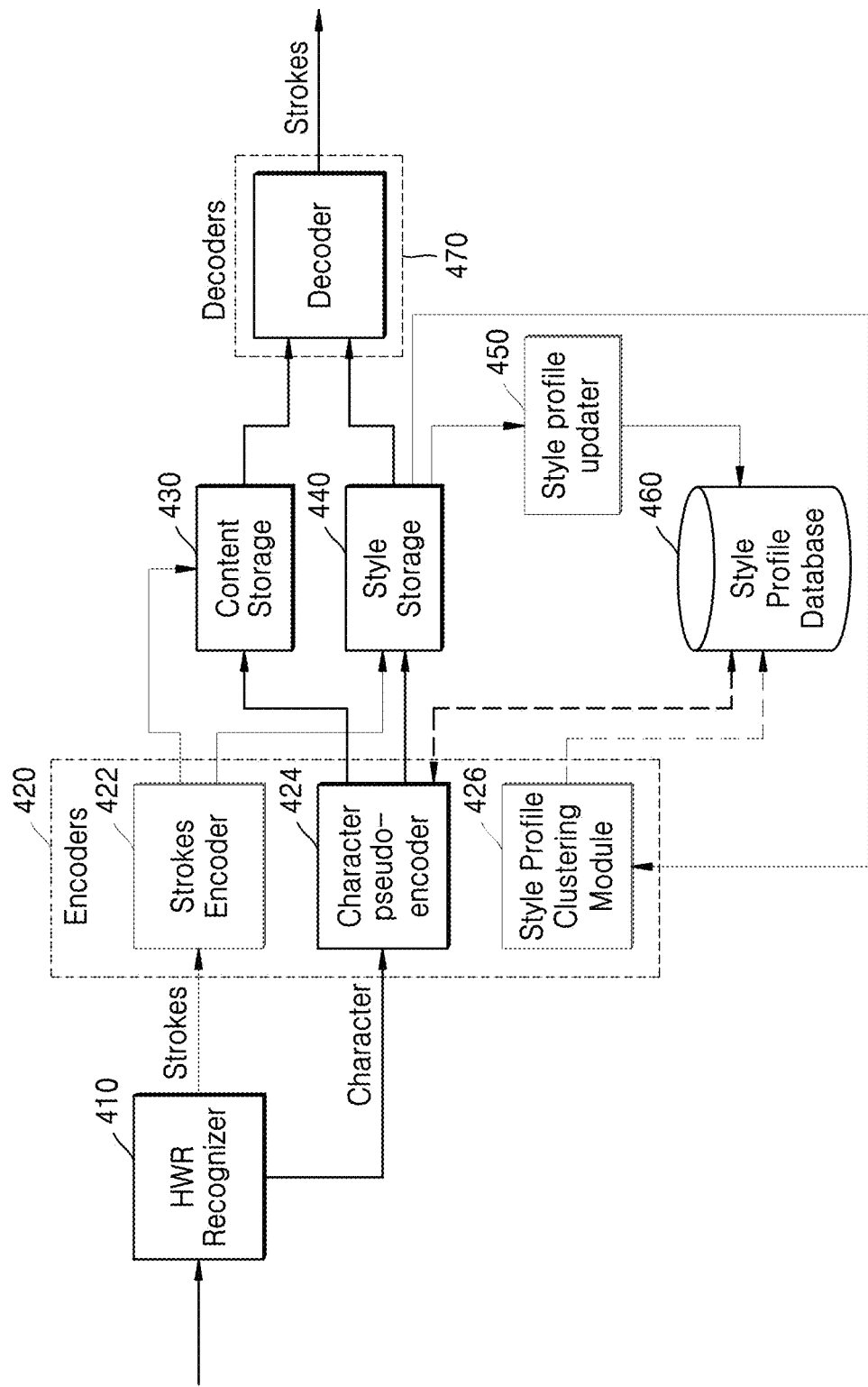
FIG. 4D is a block diagram illustrating handwriting input sampling according to an embodiment of the disclosure.

FIG. 4D is a block diagram illustrating handwriting input sampling according to an embodiment of the disclosure.

The HWR recognizer 410 transmits a character extracted from a handwriting input to the character pseudo-encoder 424. The character pseudo-encoder 424 fetches a user's style from the style profile database 460. The decoder 470 performs, based on the character and the user's style received from the character pseudo-encoder 424, handwriting input sampling for reconstructing the character.

Figure 4E:
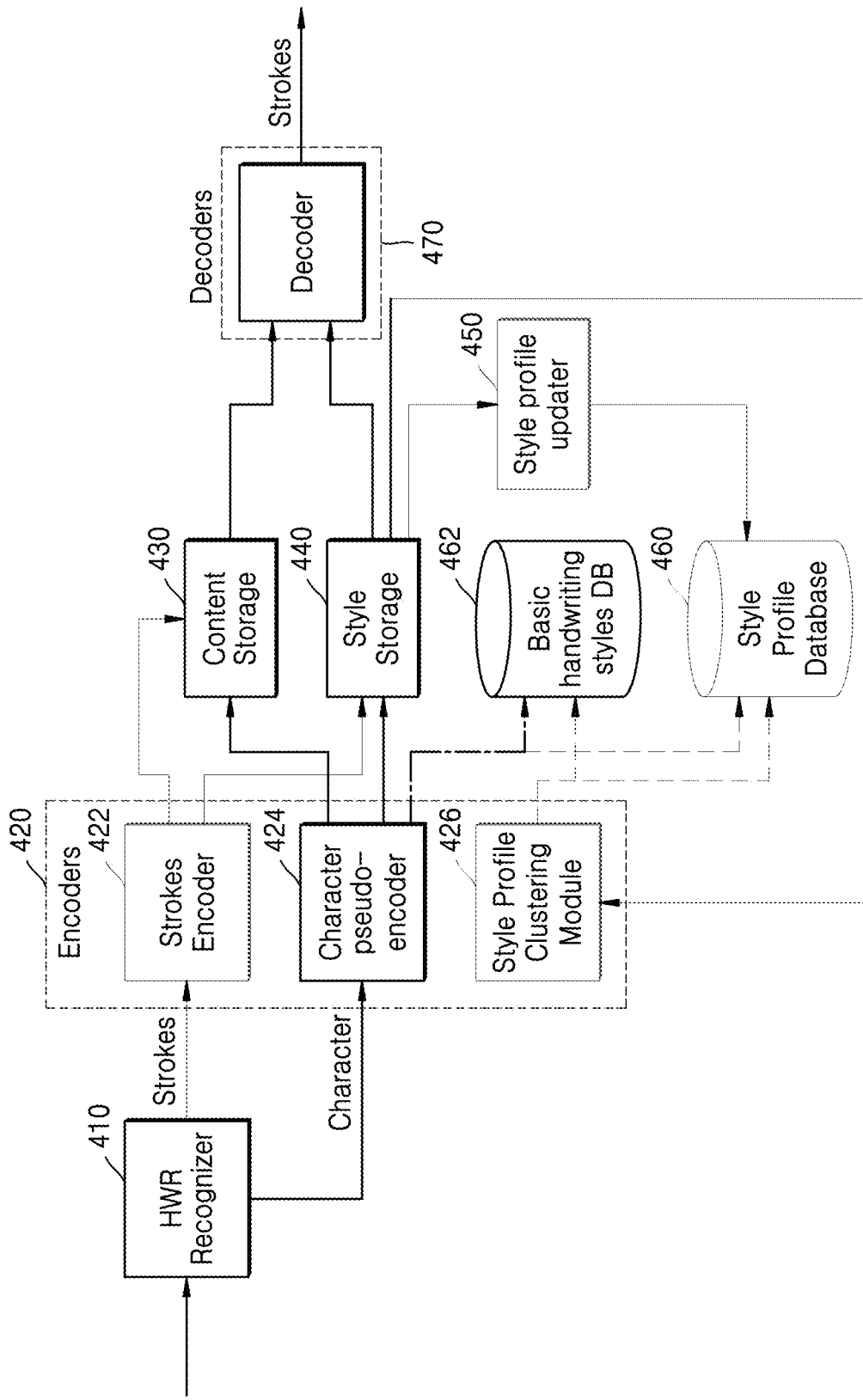
FIG. 4E is a block diagram illustrating handwriting input sampling according to an embodiment of the disclosure.

FIG. 4E is a block diagram illustrating handwriting input sampling according to an embodiment of the disclosure.

Referring to FIG. 4E, an electronic device according to the disclosure may further include a basic handwriting styles database 462. FIG. 4E illustrates an embodiment of the disclosure in which the handwriting input sampling is performed when an RNN is not trained.

The HWR recognizer 410 transmits a character extracted from a handwriting input to the character pseudo-encoder 424. The character pseudo-encoder 424 fetches a user's style from the style profile database 460.

When a handwriting input is performed while the electronic device has not yet been trained for handwriting recognition, the character pseudo-encoder 424 fetches a similar handwriting style from the basic handwriting styles database 462 so that the similar input style is output via the decoder 470. In other words, because the electronic device has not yet learned a current handwriting input, the electronic device does not display a current handwriting input style directly on a display but instead fetches the most similar handwriting style stored in the basic handwriting styles database 462 and display it on the display. In this case, the electronic device performs handwriting input clustering to detect a most similar handwriting style stored in the basic handwriting style database 462. In other words, the most similar handwriting style may be determined by comparing style clustering of feature vectors extracted from the current handwriting input with stored handwriting input clustering. In an embodiment of the disclosure, the electronic device may determine, as similar clustering, a case in which a distance between representative values for each clustering (mean values of clustering values) is closest. In another embodiment of the disclosure, the electronic device may define an envelope of clustering and determine, as most similar clustering, a case where there is a largest overlapping area between clusterings. In another embodiment of the disclosure, the electronic device may determine a range (an area) defined by certain values around from a representative value for clustering (a mean value of clustering values), and determine, as the most similar clustering, a case where there is a largest overlapping area between clusterings.

In an embodiment of the disclosure, the style profile database 460 and the basic handwriting styles database 462 may be integrated into a single database.

Examples of clustering algorithms may include, but are not limited to, K-means clustering, mean-shift clustering, density-based spatial clustering of applications with noise (DBSCAN), expectation-maximization (EM) clustering using Gaussian mixture models (GMMs), and hierarchical agglomerative clustering (HAC), and any clustering technique capable of clustering feature vectors may be used.

Figure 4F:
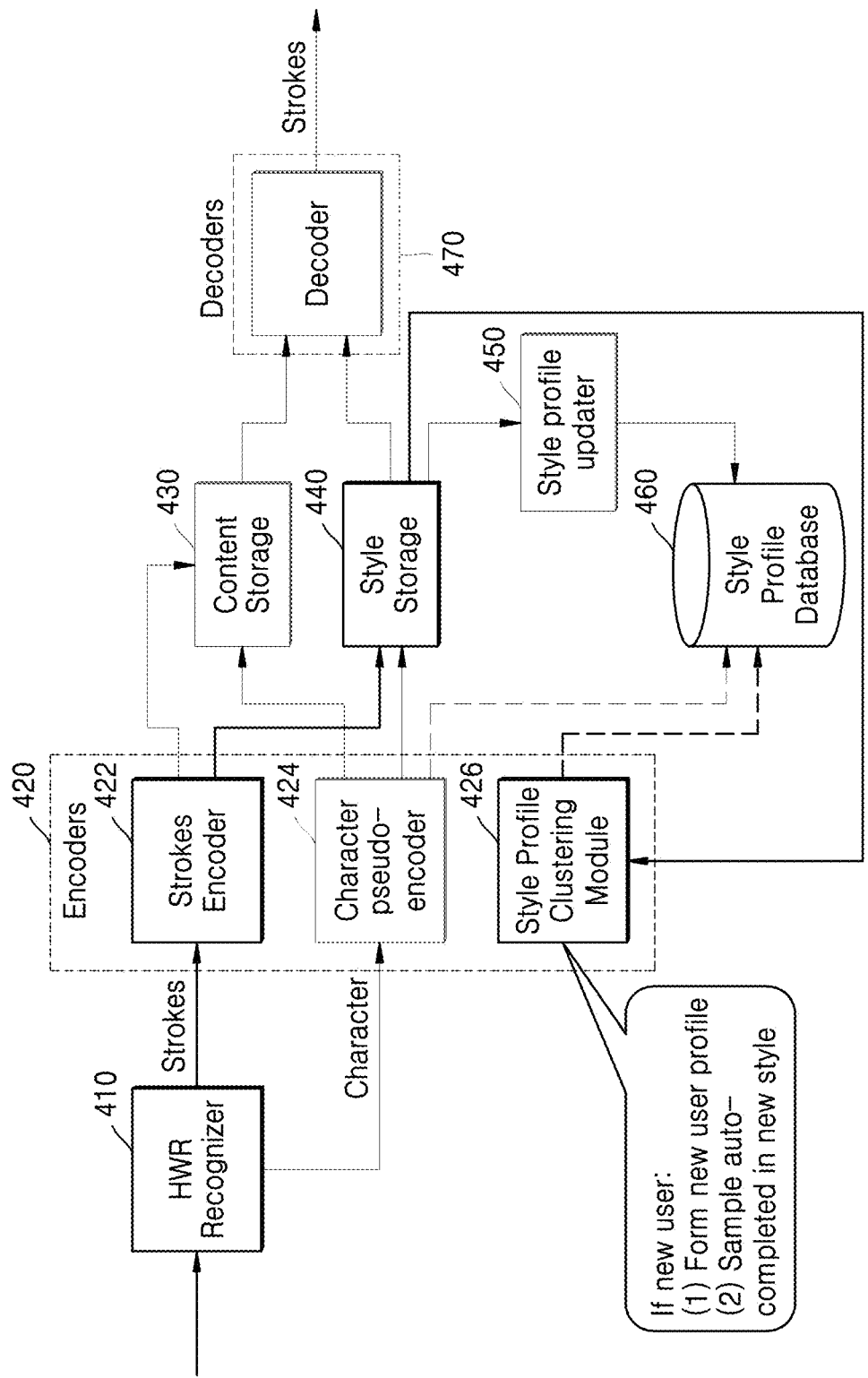
FIG. 4F is a block diagram illustrating clustering of a user's handwriting input styles according to an embodiment of the disclosure.

FIG. 4F is a block diagram illustrating clustering of a user's handwriting input styles according to an embodiment of the disclosure.

Referring to FIG. 4F, a HWR recognizer 410 transmits strokes constituting a character in a handwriting input to a strokes encoder 422, and the strokes encoder 422 stores the strokes in a style storage 440. The style profile clustering module 426 analyzes a style of the handwriting input, and when the user is determined as a new user, generates a new user profile and stores it in the style profile database 460.

Figure 6:
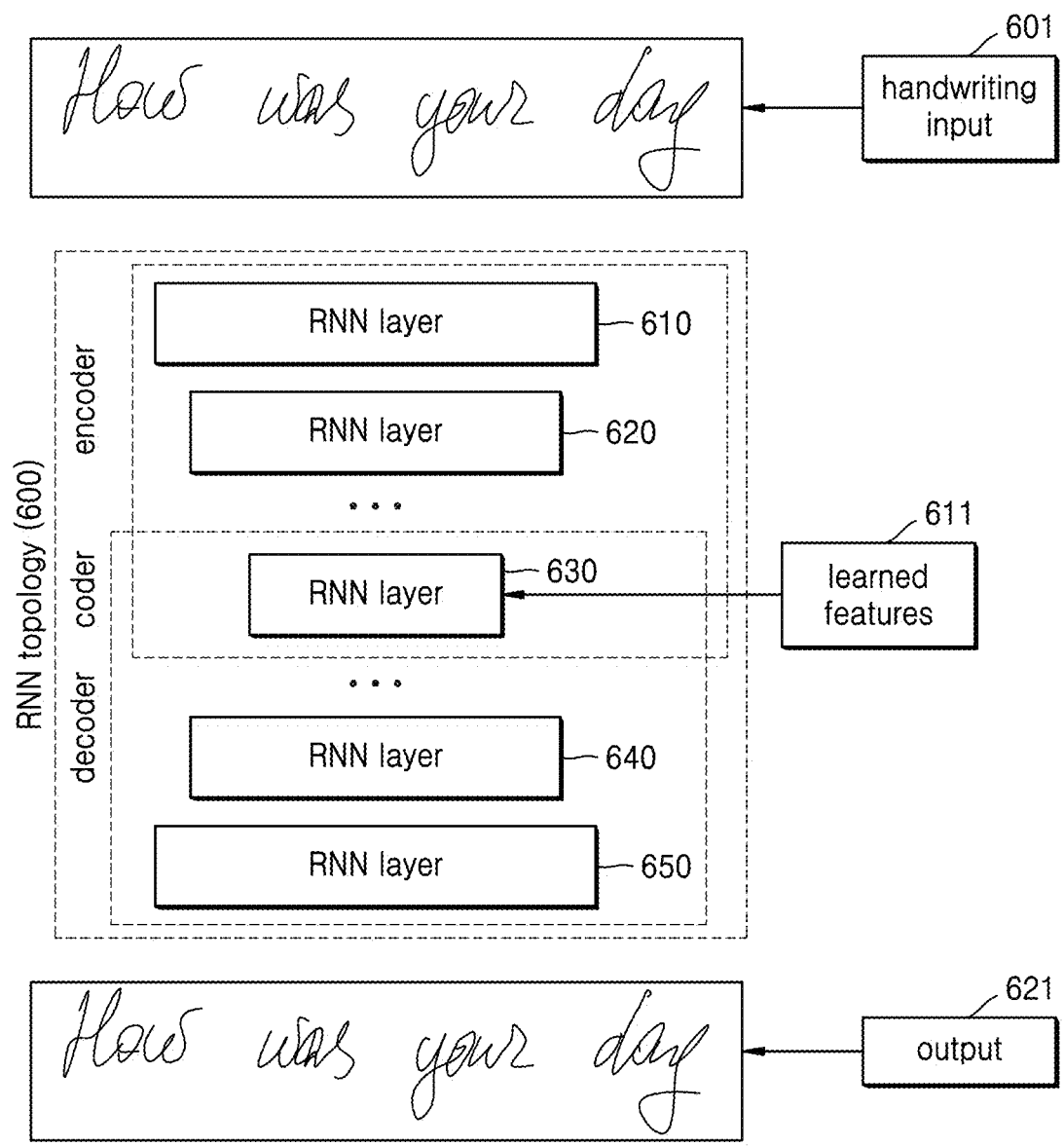
FIG. 6 is a diagram illustrating an RNN topology for deep feature extraction according to an embodiment of the disclosure.

FIG. 6 is a diagram illustrating an RNN topology for deep feature extraction according to an embodiment of the disclosure.

Referring to FIG. 6, a RNN topology 600 includes RNN layers 610 and 620 in an encoder stage, an RNN layer 630 reflecting learned features 611, and RNN layers 640 and 650 in a decoder stage. Deep features are extracted from a handwriting input 601 and learned through RNN layers 610, 620, . . . , 650 in the RNN topology 600.

The encoder 420 compresses the handwriting input 601 into a code with a smaller amount of data in the handwriting input data in the input layer. The decoder 470 decompresses the code with a smaller amount of data into a data sequence that closely matches the original handwriting input.

A handwriting input feature vector consisting of the learned features 611 includes more information than features for the handwriting input. For example, a learned feature vector may further include time information regarding each stroke and/or a handwriting input trajectory. In addition, the learned handwriting input feature vector includes a handwriting input style.

In an embodiment of the disclosure, the generated handwriting input feature vector may include several sub-feature vectors. For example, the sub-feature vectors may include a character-level sub-feature vector for each character included in the handwriting input, an allograph-level sub-feature vector representing a handwriting style for each character included in the handwriting input, and a word-level sub-feature vector for each word included in the handwriting input.

In other words, the electronic device may generate user feature vectors including the above-described sub-feature vectors and cluster the user feature vectors.

In an embodiment, the electronic device may generate the output 621 based on the user feature vectors and the handwriting input 601.

Figure 7:
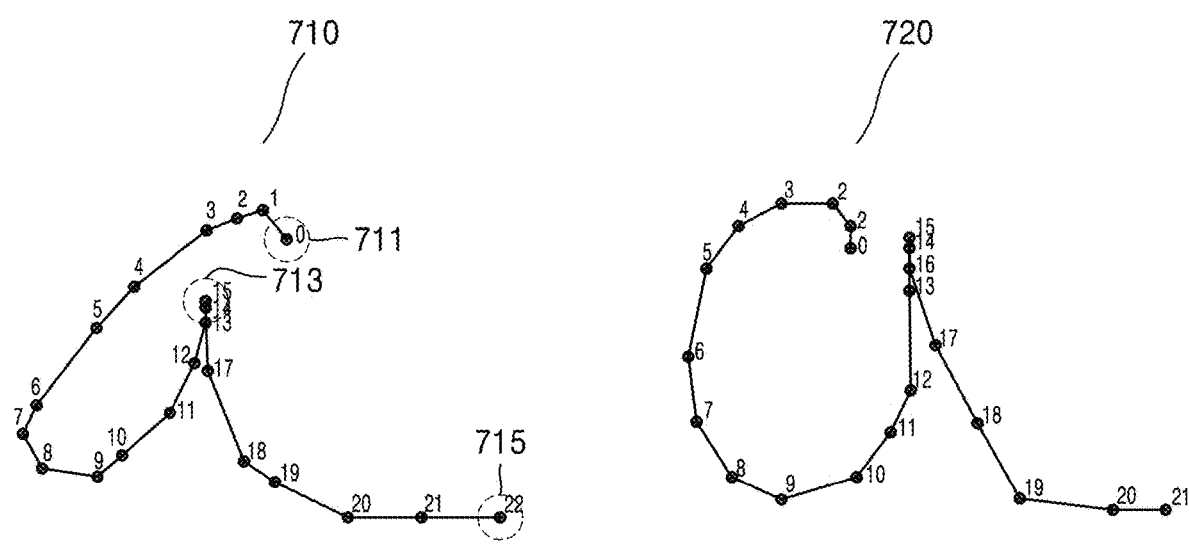
FIG. 7 is a diagram illustrating handwriting input data according to an embodiment of the disclosure.

FIG. 7 is a diagram illustrating handwriting input data according to an embodiment of the disclosure.

FIG. 7 illustrates two examples in which an alphabet letter 'a' is handwritten.

Because a first 'a' 710 and a second 'a' 720 have different writing styles, the first 'a' 710 and the second 'a' 720 are determined to be handwriting inputs from different users. A processor of the electronic device may extract trajectory data for a user's strokes from both the first 'a' 710 and the second 'a' 720. In addition, the trajectory data may include position data of a point on a trajectory as well as time data regarding a time when the point is input. The processor may measure the time it takes for each point to complete one stroke within a character through the time data, and include the time as part of feature vector data. For example, when users A and B each write down an alphabet letter 'b', the times it takes to make a vertical, downward stroke may be different from each other. Such time data may be a pattern capable of distinguishing between users A and B when the users A and B input handwritten letters. Furthermore, even for the same user, it may take a relatively long time to write a particular stroke. For example, it may take longer for a user to draw downward a vertical line in a letter 'q' than in other cases where the user draws vertical lines downward.

Referring to FIG. 7, a processor may determine a first stroke constituting an initial portion of the first 'a' 710 that is a handwritten letter 'a' through a trajectory between a first start point 711 of the first 'a' 710 and an end point 713 of the first stroke. In addition, the processor may determine a second stroke that constitutes a latter portion of the first 'a' 710 through a trajectory between the end point 713 of the first stroke as a start point of the second stroke and an end point 715 that finishes the first 'a' 710.

Figure 8:
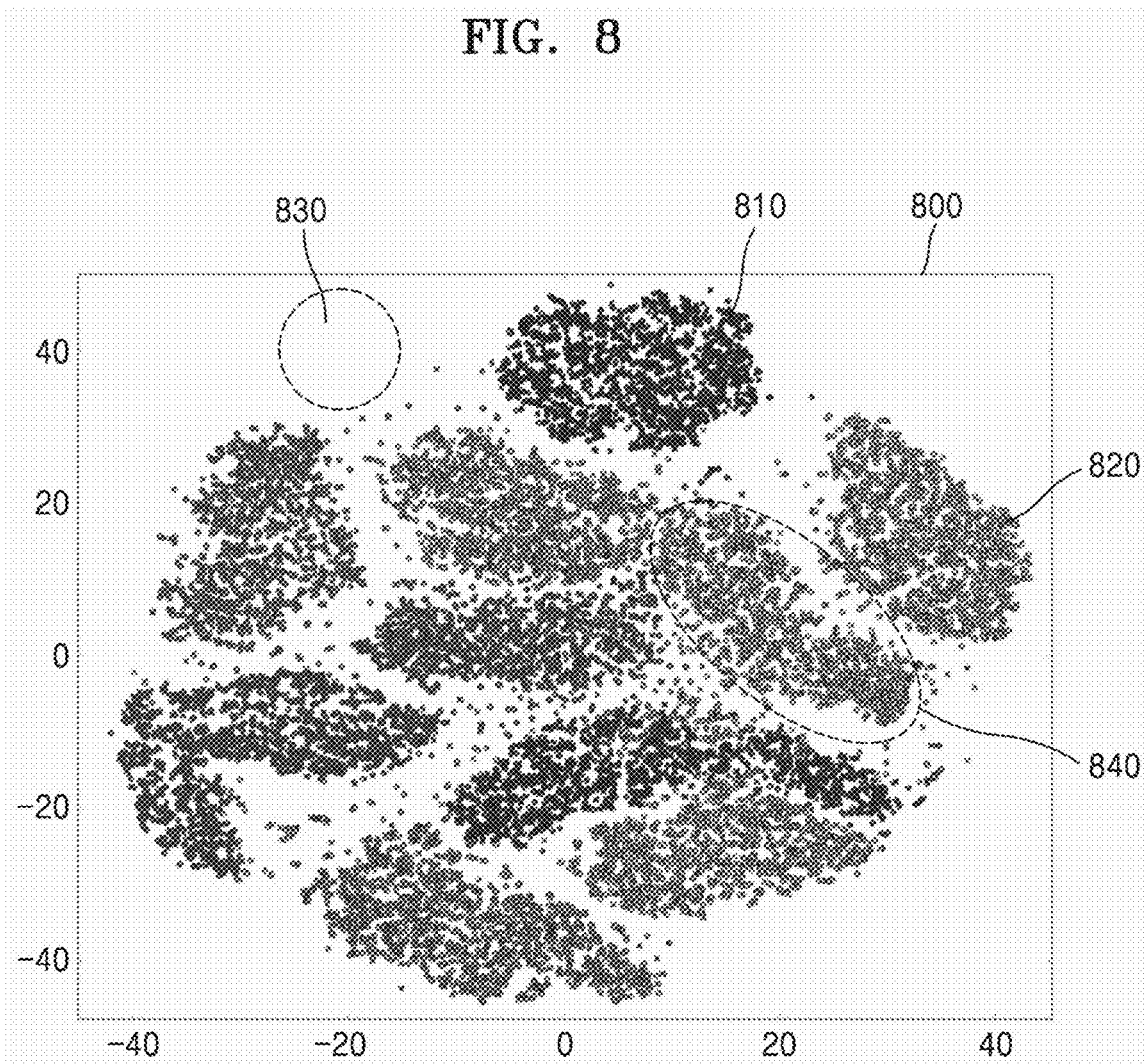
FIG. 8 is a two-dimensional (2D) spatial distribution diagram in which feature vectors for a plurality of users are clustered, according to an embodiment of the disclosure.

FIG. 8 is a two-dimensional (2D) spatial distribution diagram 800 in which feature vectors for a plurality of users are clustered, according to an embodiment of the disclosure.

Because each user has a different handwriting style and different strokes, when the electronic device controls feature vectors for a user's handwriting input to be represented in a 2D space, regions where multiple feature vectors are densely distributed may be different depending on users. In other words, feature vectors for user A may be densely distributed over the same region as in a distribution 810, while feature vectors for user B may be densely distributed over the same region as in a distribution 820. When the electronic device receives a handwriting input from a certain user and plots feature vectors generated from the handwriting input in the 2D space so that a distribution of the feature vectors is similar to the distribution 820, the electronic device may determine the user as being user B. When the electronic device receives a handwriting input from a certain user, and feature vectors generated from the handwriting input is plotted in a region 830 that does not belong to a distribution for existing users, the electronic device may determine the user as a new user and not an existing user.

When a clustering distribution of feature vectors generated from a user's handwriting input is equal to the distribution 820, and handwriting input features are not learned but most similar handwriting needs to be displayed, the electronic device may display, on a display, handwriting that constitutes handwriting feature vectors in a cluster 840 that is closest to a cluster of the feature vectors distributed according to the distribution 820.

Figure 9:
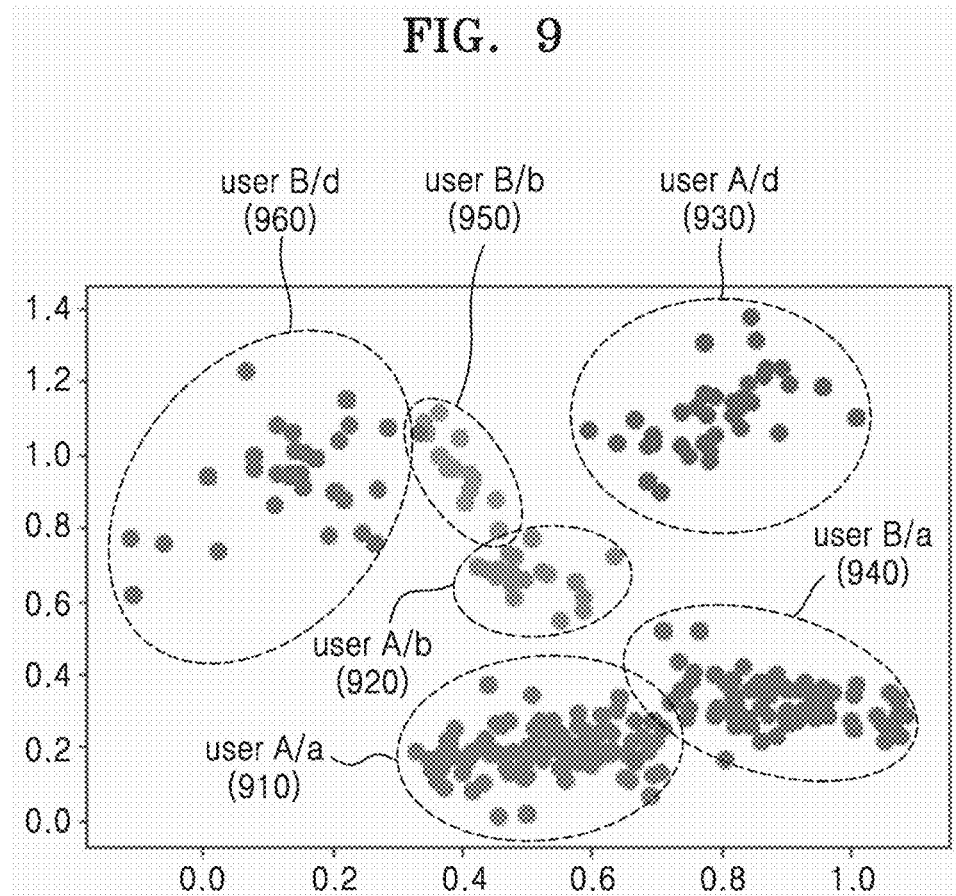
FIG. 9 is a 2D spatial distribution diagram illustrating feature vectors for a plurality of users, according to an embodiment of the disclosure.

FIG. 9 is a 2D spatial distribution diagram illustrating feature vectors for a plurality of users, according to an embodiment of the disclosure.

FIG. 9, depicting a 2D spatial distribution diagram 900, shows that feature vectors for handwritten alphabet letters 'a' 910, 'b' 920, and 'd' 930 input by user A are plotted in a 2D space, and feature vectors for handwritten alphabet letters 'a' 940, 'b' 950, and 'd' 960 input by user B are plotted in the same 2D space.

Referring to FIG. 9, distributions of feature vectors plotted in the 2D space may be different depending on users even for the same input letter. Thus, the electronic device may determine the sameness of a user by comparing clustering distributions of feature vectors for the letter 'a' with one another.

Figure 10:
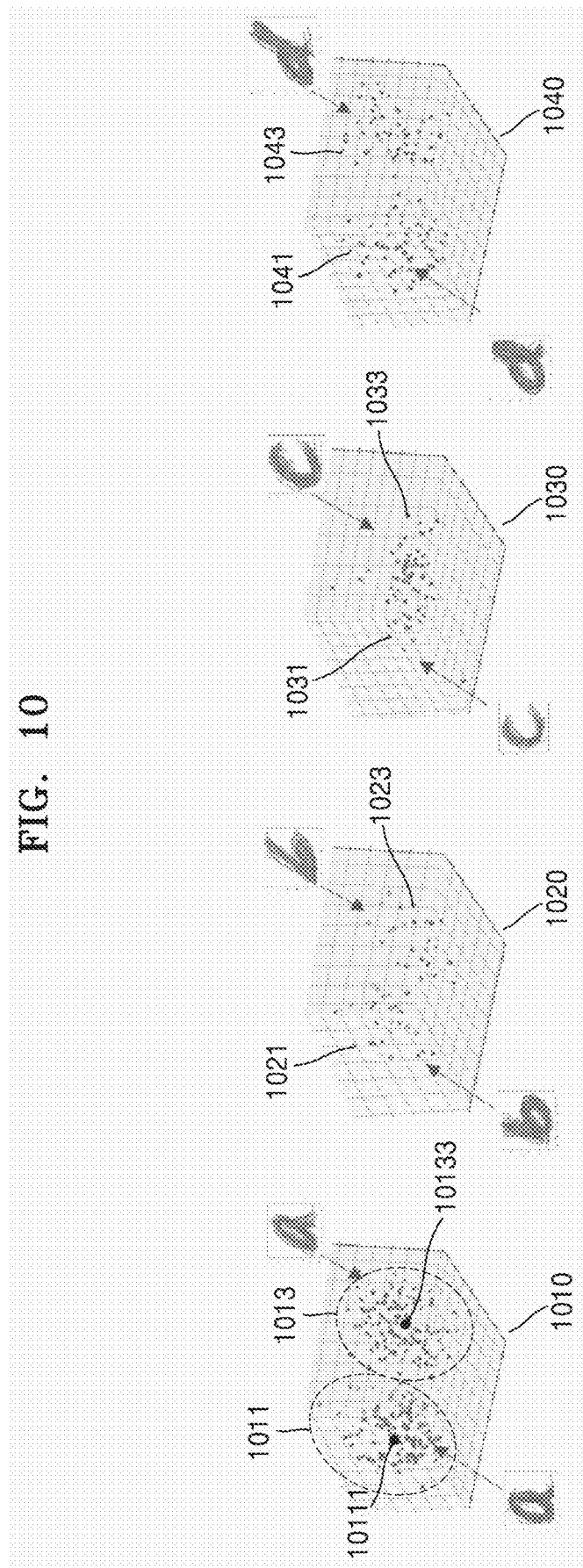
FIG. 10 is a diagram illustrating feature vectors for alphabet letters input by a plurality of users in a three-dimensional (3D) space, according to an embodiment of the disclosure.

FIG. 10 is a diagram illustrating a representation of feature vectors for alphabet letters input by a plurality of users in a three-dimensional (3D) space, according to an embodiment of the disclosure.

Referring to FIG. 10, an electronic device displays, in 3D spaces 1010, 1020, and 1030, feature vectors when alphabet letters a, b, c, and d are input by each of users A and B.

When the users A and B each input the letter a, distributions 1011 and 1013 of feature vectors respectively corresponding to the users A and B are displayed in the 3D space 1010. A distribution of feature vectors means clustering of the feature vectors.

When the users A and B each input the letter b, distributions 1021 and 1023 of feature vectors respectively corresponding to the users A and B are displayed in the 3D space 1020.

When the users A and B each input the letter c, distributions 1031 and 1033 of feature vectors respectively corresponding to the users A and B are displayed in the 3D space 1030.

When the users A and B each input the letter d, distributions 1041 and 1043 of feature vectors respectively corresponding to the users A and B are displayed in the 3D space 1040.

In an embodiment of the disclosure, a method, performed by the electronic device, of determining whether the users A and B are the same person based on the distributions of feature vectors for the letter a input by the users A and B is as follows. The electronic device displays a feature vector for the letter a input by the user A, calculates a mean value from the distribution of the feature vectors, and designates the mean value as a feature vector representative value. When the electronic device obtains a feature vector representative value, a method of excluding values deviated from a preset distance or greater or preset upper and lower bounds (top 3% or higher and bottom 3% or lower) on a mean or variance value of feature vectors may be used. In a distribution of feature vectors for the letter a input by the user B, when a certain ratio of the feature vectors, e.g., 85% or 90% of the feature vectors, are all within the preset distance, the electronic device may determine that the users A and B are the same person. Alternatively, when the electronic device obtains a feature vector representative value from a distribution of feature vectors for an alphabet letter input by the user B in the same manner as in the case of user A, the electronic device may determine that the users A and B are the same person when the difference between the feature vector representative values for the users A and B are less than a preset value. In an embodiment of the disclosure, the processor of the electronic device determines whether the user B is the same person as the user A by determining the degree of overlap between the distributions of the feature vectors for the letter a input by the users A and B.

When, as in the 3D space 1010, the distribution of the feature vectors for the letter a input by the user B has little overlap with the distribution of the feature vectors for the letter a input by the user A, the processor of the electronic device determines that the user B is a new user.

Alternatively, when, as in the 3D space 1010, in feature vector clustering, a distance between a feature vector representative value 10111 for the distribution of feature vectors for the handwriting input from the user A and a feature vector representative value 10133 for the distribution of feature vectors for the handwriting input from the user B is greater than or equal to a preset value, the electronic device determines that the users A and B are different users. On the other hand, when the distance between the two feature vector representative values is less than the preset value, the electronic device determines that the users A and B are the same person.

Figure 11:
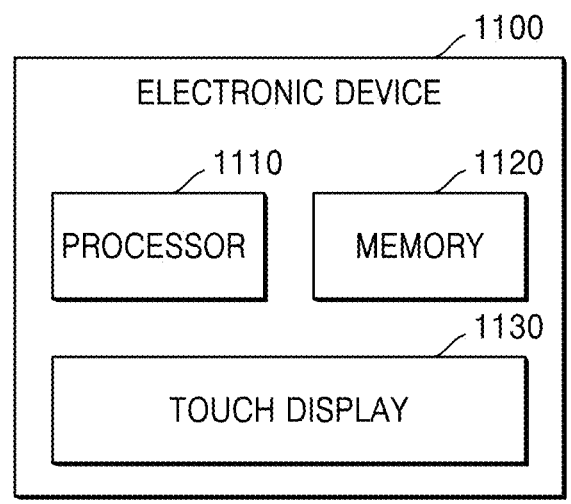
FIG. 11 is a block diagram of an electronic device according to an embodiment of the disclosure.

FIG. 11 is a block diagram of an electronic device according to an embodiment of the disclosure.

Referring to FIG. 11, an electronic device 1100 according to an embodiment of the disclosure includes a processor 1110, a memory 1120, and a touch display 1130.

In an embodiment of the disclosure, the processor 1110 may be implemented to include the HWR recognizer 410, the encoder 420, the style profile updater 450, and the decoder 470 as shown in FIG. 4A. The memory 1120 may be configured as one memory or a plurality of memories including the content storage 430, the style storage 440, the style profile database 460, and the basic handwriting styles database 462.

Figure 12:
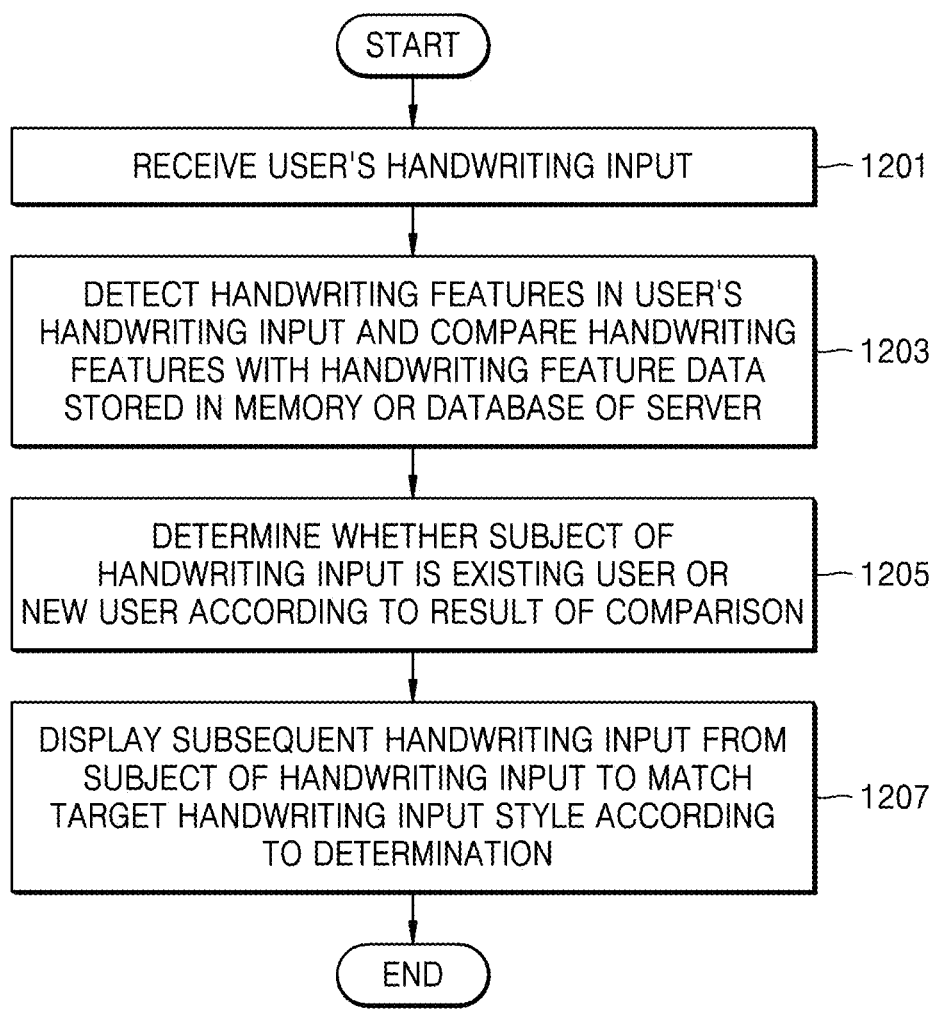
FIG. 12 is a flowchart of an adaptive handwriting generation method according to an embodiment of the disclosure.

FIG. 12 is a flowchart of an adaptive handwriting generation method according to an embodiment of the disclosure.

Referring to FIG. 12, even when a new user performs a handwriting input, an electronic device 1100 learns a new user's handwriting in real-time instead of reflecting an existing user's handwriting input stored in a database so that the new user's handwriting may be reflected directly on the display in real-time.

In operation 1201, the electronic device 1100 receives a user's handwriting input.

In operation 1203, the processor 1110 of the electronic device 1100 detects handwriting features in the user's handwriting input and compares the handwriting features with handwriting feature data stored in a memory or a database of a server. In this case, the processor 1110 may use a method of comparing feature vectors (a cluster of feature vectors) representing the detected handwriting features with stored handwriting feature vectors. When detecting the handwriting features in the user's handwriting input, the processor 1110 may also detect a series of time information respectively corresponding to a sequence of strokes made during handwriting. The detected time information may be reflected in a feature vector.

In operation 1205, the processor 1110 determines whether a subject of the handwriting input is an existing user or a new user according to a result of the comparison.

In operation 1207, according to the determination, the processor 1110 controls the touch display 1130 to display a subsequent handwriting input from the subject of the handwriting input so that the subsequent handwriting input matches a target handwriting input style. In an embodiment of the disclosure, when the subject of the handwriting input is determined to be a new user, the target handwriting input style is a handwriting input style of the new user. When the subject of the handwriting input is not a new user, the target handwriting input style may be stored as one of the existing handwriting input styles in the database. The processor 1110 may apply the target handwriting input style using a correction model to the subsequent handwriting input, based on the handwriting features detected in the received handwriting input.

Figure 13:
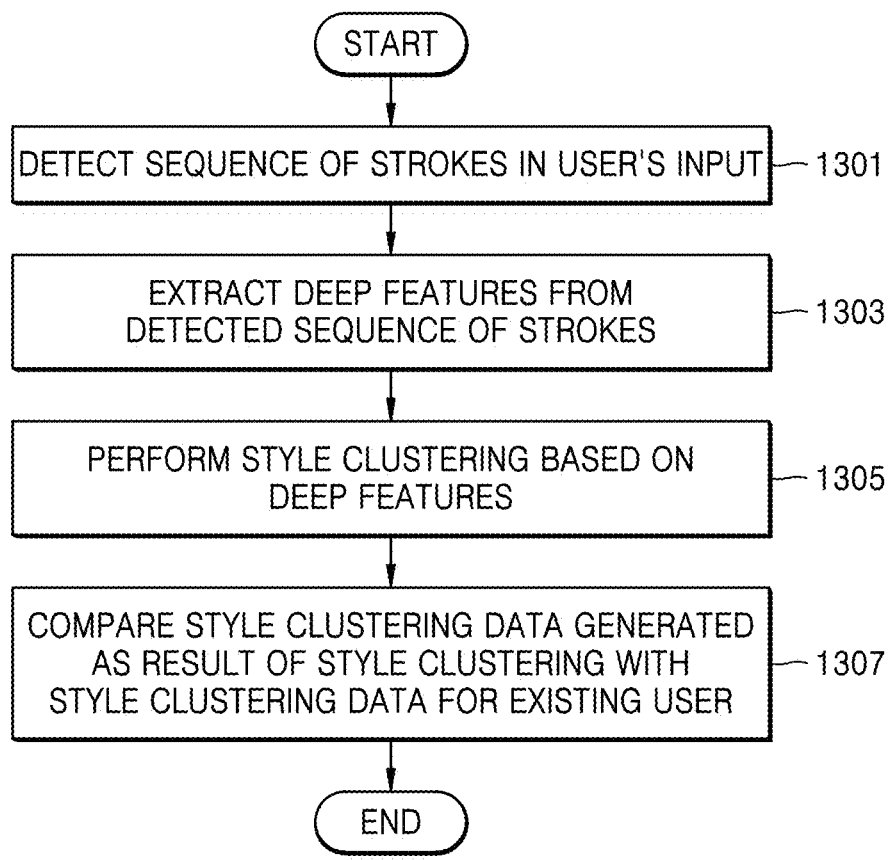
FIG. 13 is a flowchart of a method of detecting handwriting features in a handwriting input and comparing the detected handwriting features with stored handwriting feature data, according to an embodiment of the disclosure.

FIG. 13 is a flowchart of a method of detecting handwriting features in a handwriting input and comparing the detected handwriting features with stored handwriting feature data, according to an embodiment of the disclosure.

First, in operation 1301, the processor 1110 detects a sequence of strokes in a user's handwriting input. A stroke refers to drawing a line that makes up a character.

In operation 1303, the processor 1110 extracts deep features from the detected sequence of strokes, and in operation 1305 performs style clustering based on the deep feature. Although there are various clustering algorithms, clustering techniques such as TreeClust, MinSwap, and CMeans 1 or CMeans 2 algorithms may be used. In an embodiment of the disclosure, deep feature extraction may be performed via learning using an RNN.

In operation 1307, the processor 1110 compares style clustering data generated as a result of style clustering with style clustering data for an existing user. As a comparison method, as described with reference to FIG. 10, a method of comparing the degree similarity between feature vector distributions is used.

In detail, when the generated style clustering data is similar to the style clustering data for the existing user by a certain level or higher, the processor 1110 determines a subject of the handwriting input as being the existing user. On the other hand, when the style clustering data is not similar to the style clustering data for the existing user by a certain level or higher, the processor 1110 determines the subject of the handwriting input as being a new user.

When the processor 1110 determines the subject of the handwriting input as being the new user according to a result of the above comparison, the processor 1110 generates style profile data for the new user based on style clustering data for the new user and stores the style profile data in the memory 1120 or a database on a remote server. The stored style profile data is used as comparison data for determining whether the user is an existing user or a new user in the same manner as above when a handwriting input from another user is performed.

In an embodiment of the disclosure, when the processor 1110 extracts deep features from a sequence of strokes, generating a character-level feature vector for each character included in the handwriting input and comparing style clustering data generated as a result of style clustering with style clustering data for an existing user may include comparing the style clustering data including the generated character-level feature vector with the style clustering data including a character-level feature vector for the existing user.

In an embodiment of the disclosure, when a feature vector is generated by extracting deep features, the generated feature vector may include a plurality of sub-feature vectors. For example, the processor 1110 may generate a character-level sub-feature vector for each character included in the handwriting input, an allograph-level sub-feature vector representing a handwriting style for each character included in the handwriting input, and a word-level sub-feature vector for each word included in the handwriting input, and generate a user feature vector by merging the generated sub-feature vectors. In addition, when the processor 1110 compares style clustering data generated as a result of style clustering with style clustering data for an existing user, the comparison may include comparing the style clustering data including the user feature vector generated as above with the style clustering data including a user feature vector for the existing user.

In an embodiment of the disclosure, the processor 1110 may detect an end of a unit of the handwriting input.

A method, performed by the processor 1110, of detecting an end of a unit of a handwriting input may include at least one selected from the group of detecting that a pause period before a new handwriting input after a user's handwriting input exceeds a preset time, detecting that an interval exceeding a preset interval is generated between the handwriting input and the new handwriting input, and detecting that a character is input between the handwriting input and the new handwriting input.

Embodiments according to the disclosure may be implemented through at least one software program running on at least one hardware device and performing a network management function to control components of the hardware device.

The methods according to embodiments of the disclosure may be implemented in the form of program instructions executable by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tape, optical media such as compact disk read-only memory (CD-ROMs) and digital versatile disks (DVDs), magneto-optical media such as floptical disks, and hardware devices that are specially configured to store and perform program instructions, such as ROM, random-access memory, flash memory, etc. Examples of program instructions include not only machine code such as that generated by a compiler but also higher level language code executable by a computer using an interpreter or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An adaptive handwriting generation method comprising:
   receiving a handwriting input from an electronic device;
   detecting handwriting features in the handwriting input and comparing the handwriting features with stored handwriting feature data;
   determining, according to a result of the comparing, whether a subject of the handwriting input is an existing user or a new user to determine a target handwriting stroke style;
   adjusting, according to the determination, the target handwriting stroke style to a subsequent handwriting input by the subject of the handwriting input; and
   displaying the adjusted subsequent handwriting input by the subject of the handwriting input,
   wherein the detecting of the handwriting features in the handwriting input and the comparing of the handwriting features with stored handwriting feature data comprises:
      detecting a sequence of strokes in the handwriting input;
      extracting deep features from the sequence of strokes;
      performing style clustering based on the deep features; and
      comparing style clustering data generated as a result of the style clustering with style clustering data for the existing user,
   wherein the extracting of the deep features from the sequence of strokes comprises:
      generating a first sub-feature vector at a character level for each character included in the handwriting input;
      generating a second sub-feature vector at an allograph level, which represents a handwriting style for each character included in the handwriting input;
      generating a third sub-feature vector at a word level for each word included in the handwriting input; and
      generating a user feature vector by merging the first through third sub-feature vectors, and
   wherein the comparing of the style clustering data generated as a result of the style clustering with the style clustering data for the existing user comprises comparing the style clustering data including the user feature vector with the style clustering data including a user feature vector for the existing user.

2. The adaptive handwriting generation method of claim 1, wherein the determining of whether the subject of the handwriting input is the existing user or the new user according to the result of the comparing comprises:

in response to the generated style clustering data being similar to the style clustering data for the existing user by a predetermined level, determining the subject of the handwriting input as being the existing user; and in response to the style clustering data not being similar to the style clustering data for the existing user by the predetermined level, determining the subject of the handwriting input as being the new user.

3. The adaptive handwriting generation method of claim 2, further comprising, in response to the subject of the handwriting input being determined as being the new user, generating style profile data for the new user based on style clustering data for the new user.

4. The adaptive handwriting generation method of claim 1, wherein the comparing of the style clustering data generated as the result of the style clustering with the style clustering data for the existing user comprises comparing the generated style clustering data with style clustering data for the existing user stored in a database or a remote server.

5. The adaptive handwriting generation method of claim 1, wherein the extracting of the deep features from the sequence of strokes is performed via learning using a recurrent neural network.

6. The adaptive handwriting generation method of claim 1, wherein the detecting of the sequence of strokes in the handwriting input comprises detecting together a series of time information respectively corresponding to the sequence of strokes.

7. The adaptive handwriting generation method of claim 1, further comprising detecting an end of a unit of the handwriting input.

8. The adaptive handwriting generation method of claim 7, wherein the detecting the end of the unit of the handwriting input comprises at least one of:

detecting that a time before a new handwriting input after the handwriting input exceeds a preset time;

detecting that an interval exceeding a preset spatial interval is generated between the handwriting input and the new handwriting input; or detecting that a character is input between the handwriting input and the new handwriting input.

9. The adaptive handwriting generation method of claim 1, wherein the displaying of the adjusted subsequent handwriting input by the subject of the handwriting input comprises, in response to the subject of the handwriting input being determined as being the new user, generating the target handwriting stroke style as a handwriting stroke style of the new user.

10. The adaptive handwriting generation method of claim 1, wherein the displaying of the adjusted subsequent handwriting input by the subject of the handwriting input comprises: in response to the subject of the handwriting input not being the new user, including the target handwriting stroke style in existing handwriting input styles stored in a database.

11. The adaptive handwriting generation method of claim 1, wherein the displaying of the adjusted subsequent handwriting input by the subject of the handwriting input comprises: applying, based on the handwriting features detected in the received handwriting input, the target handwriting stroke style using a correction model to the subsequent handwriting input.

12. An adaptive handwriting generation apparatus comprising:

a display receiving a handwriting input; and a processor configured to:

detect handwriting features in the handwriting input and compare the handwriting features with stored handwriting feature data, determine, according to a result of the comparing, whether a subject of the handwriting input is an existing user or a new user to determine a target handwriting stroke style, wherein the detecting of the handwriting features in the handwriting input and the comparing of the handwriting features with stored handwriting feature data comprises:

detecting a sequence of strokes in the handwriting input;

extracting deep features from the sequence of strokes;

performing style clustering based on the deep features; and comparing style clustering data generated as a result of the style clustering with style clustering data for the existing user, wherein the extracting of the deep features from the sequence of strokes comprises:

generating a first sub-feature vector at a character level for each character included in the handwriting input;

generating a second sub-feature vector at an allograph level, which represents a handwriting style for each character included in the handwriting input;

generating a third sub-feature vector at a word level for each word included in the handwriting input; and generating a user feature vector by merging the first through third sub-feature vectors, wherein the comparing of the style clustering data generated as a result of the style clustering with the style clustering data for the existing user comprises comparing the style clustering data including the user feature vector with the style clustering data including a user feature vector for the existing user, control to adjust, according to the determination, the target handwriting stroke style to a subsequent handwriting input by the subject of the handwriting input, and control the display to display the adjusted subsequent handwriting input by the subject of the handwriting input.

13. The adaptive handwriting generation apparatus of claim 12, wherein the processor is further configured to:

in response to the generated style clustering data being similar to the style clustering data for the existing user by a certain level or higher, determine the subject of the handwriting input as being the existing user, and in response to the style clustering data not being similar to the style clustering data for the existing user by the certain level or higher, determine the subject of the handwriting input as being the new user.

14. The adaptive handwriting generation apparatus of claim 13, wherein the processor is further configured to, in response to the subject of the handwriting input being determined as being the new user, generate style profile data for the new user based on style clustering data for the new user.

15. The adaptive handwriting generation apparatus of claim 12, wherein the processor is further configured to extract the deep features from the sequence of strokes via learning using a recurrent neural network.

16. The adaptive handwriting generation apparatus of claim 12, wherein the processor is further configured to provide an output comprising an auto-completion of the input.

17. The adaptive handwriting generation apparatus of claim 16, wherein the output is provided in the target handwriting stroke style.

18. A computer-readable recording medium having recorded thereon a program for executing the adaptive handwriting generation method of claim 1 on a computer.

* * * * *